(12) United States Patent
Stammers et al.

(10) Patent No.: US 12,341,819 B2
(45) Date of Patent: Jun. 24, 2025

(54) METHOD AND APPARATUS FOR POLICY ATTRIBUTES EXCHANGE BETWEEN SECURITY POLICY MANAGEMENT PLATFORMS AND 5G AS A SERVICE PLATFORMS

(71) Applicant: Cisco Technology, Inc., San Jose, CA (US)

(72) Inventors: Timothy P. Stammers, Raleigh, NC (US); Bhavik Adhvaryu, San Jose, CA (US); Irfan Ali, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 282 days.

(21) Appl. No.: 17/929,040

(22) Filed: Sep. 1, 2022

(65) Prior Publication Data
US 2023/0412643 A1    Dec. 21, 2023

Related U.S. Application Data

(60) Provisional application No. 63/351,066, filed on Jun. 10, 2022.

(51) Int. Cl.
H04L 9/40    (2022.01)

(52) U.S. Cl.
CPC .......... *H04L 63/20* (2013.01); *H04L 63/0876* (2013.01); *H04L 63/104* (2013.01)

(58) Field of Classification Search
None
See application file for complete search history.

(56) References Cited

U.S. PATENT DOCUMENTS

| | | | | |
|---|---|---|---|---|
| 10,609,634 | B2* | 3/2020 | Graybeal | H04W 12/06 |
| 10,757,538 | B1* | 8/2020 | Stammers | H04W 12/08 |
| 2016/0226705 | A1* | 8/2016 | Toner | H04L 67/55 |
| 2019/0268973 | A1* | 8/2019 | Bull | H04W 92/02 |
| 2020/0128399 | A1* | 4/2020 | Verma | H04W 12/73 |
| 2020/0195693 | A1 | 6/2020 | Price et al. | |
| 2020/0322385 | A1* | 10/2020 | Bombacino | G06F 9/45558 |
| 2020/0344662 | A1* | 10/2020 | Maino | H04L 43/028 |
| 2021/0083933 | A1* | 3/2021 | Bull | H04L 47/24 |
| 2021/0141913 | A1 | 5/2021 | Mosconi et al. | |

(Continued)

OTHER PUBLICATIONS

Franklin et al., "Multi-access edge computing in cellular networks" May 16, 2020, CSIT vol. 8, pp. 85-92 https://doi.org/10.1007/s40012-020-00276-6 (Year: 2020).*

(Continued)

*Primary Examiner* — Philip J Chea
*Assistant Examiner* — Bin Qing Zheng
(74) *Attorney, Agent, or Firm* — Polsinelli P.C.

(57) ABSTRACT

A private cellular management system detects that a device has connected to a private cellular network. The device is part of a device group that is associated with a policy applicable within an enterprise network and the private cellular network. The private cellular management system generates a determination corresponding to a policy effectiveness associated with the access policy based on different versions of the policy implemented in the enterprise and private cellular networks. The private cellular management system obtains an update to the access policy and applies this update for the device and other devices associated with the device group.

18 Claims, 14 Drawing Sheets

(56) References Cited

U.S. PATENT DOCUMENTS

| | | |
|---|---|---|
| 2021/0243232 A1 | 8/2021 | Verma et al. |
| 2023/0269655 A1* | 8/2023 | Parikh .................. H04W 12/03 455/411 |

OTHER PUBLICATIONS

Kabir et al., "Implementing a Security Policy Management for 5G Customer Edge Nodes," IEEE, Jun. 8, 2020, pp. 1-8.

* cited by examiner

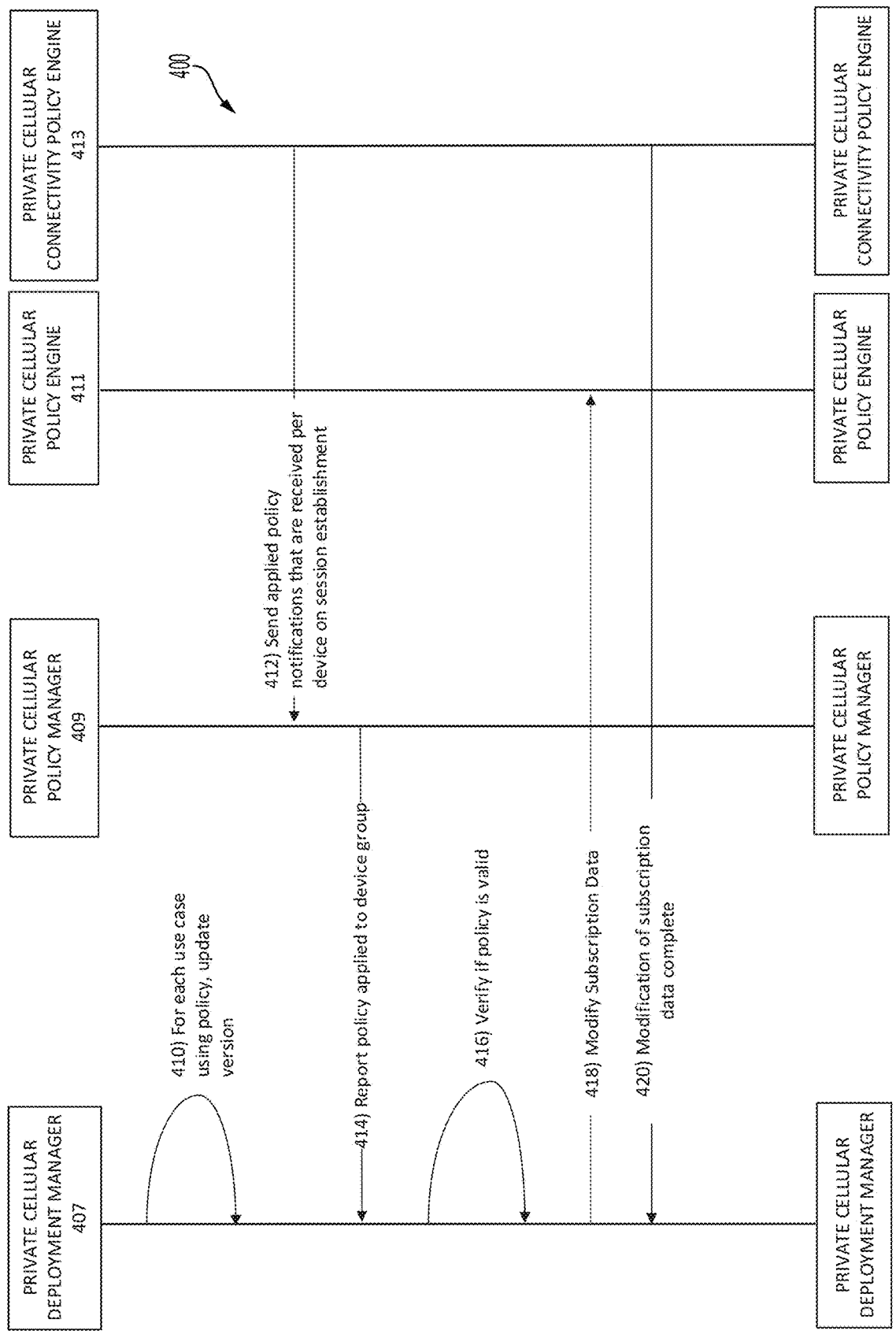

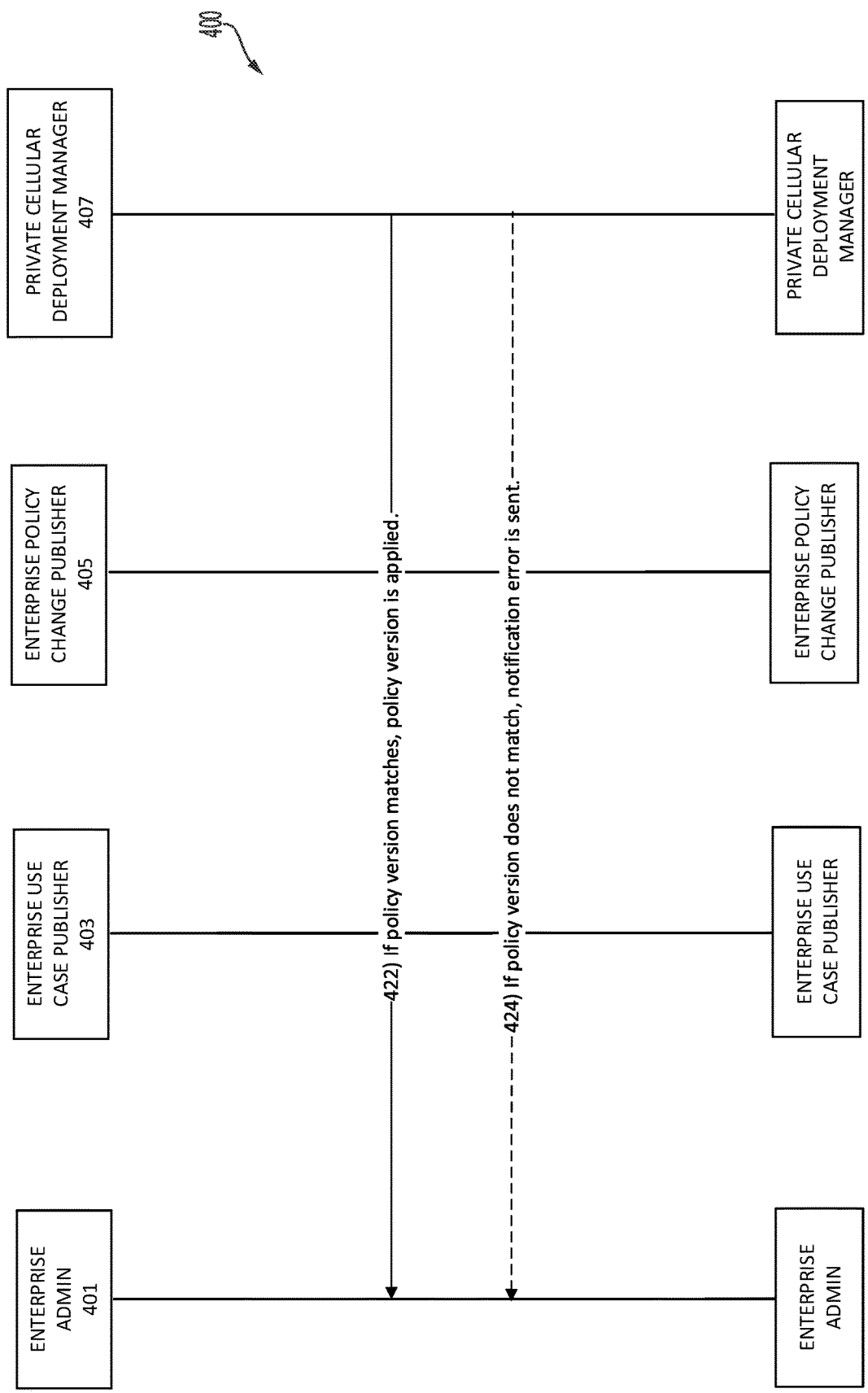

METHOD AND APPARATUS FOR POLICY ATTRIBUTES EXCHANGE BETWEEN SECURITY POLICY MANAGEMENT PLATFORMS AND 5G AS A SERVICE PLATFORMS

CROSS-REFERENCE TO RELATED APPLICATIONS

This application claims the benefit of priority from the U.S. Provisional Patent Application No. 63/351,066, filed Jun. 10, 2022, which is incorporated herein by reference in its entirety.

TECHNICAL FIELD

The present disclosure generally relates to the field of computer networking, particularly with regard to the coordination and automation of policy and identity attribute distribution between security policy management platforms and fifth-generation (5G) mobile networks as a service (5GaaS) platforms.

BACKGROUND

The proliferation of broadband cellular networks, such as 5G mobile networks, has led various organizations to adopt these broadband cellular networks at their locations, integrating these broadband cellular networks into their existing enterprise networks. These various organizations often require a mechanism where common policy and identity attributes can be applied to these new broadband cellular networks such that devices (e.g., user equipment, etc.) may have a similar experience across each of the connectivity domains associated with these various organizations while providing the required level of security.

However, the coordination and automation required for sharing enterprise policies and identities across these domains within an enterprise network are difficult. This can be particularly difficult in cases where existing use cases are already deployed in the enterprise network, a new access connectivity network is added, and the new access connectivity network is to be incorporated into these existing use cases. This difficulty is also encountered in cases where deploying an additional access connectivity network facilitates new use cases and these new use cases are defined, along with policies and identities, in an existing enterprise system. Thus, organizations often require solutions that allow for the exchange of policy attributes between these systems in order to provide similar experiences to devices across their connectivity domains.

BRIEF DESCRIPTION OF THE FIGURES

To provide a more complete understanding of the present disclosure and features and advantages thereof, reference is made to the following description, taken in conjunction with the accompanying drawings, in which:

FIGS. 4A-4E show an illustrative example of a process for updating a private cellar deployment, in accordance with at least one embodiment;

DETAILED DESCRIPTION

Figure 1:
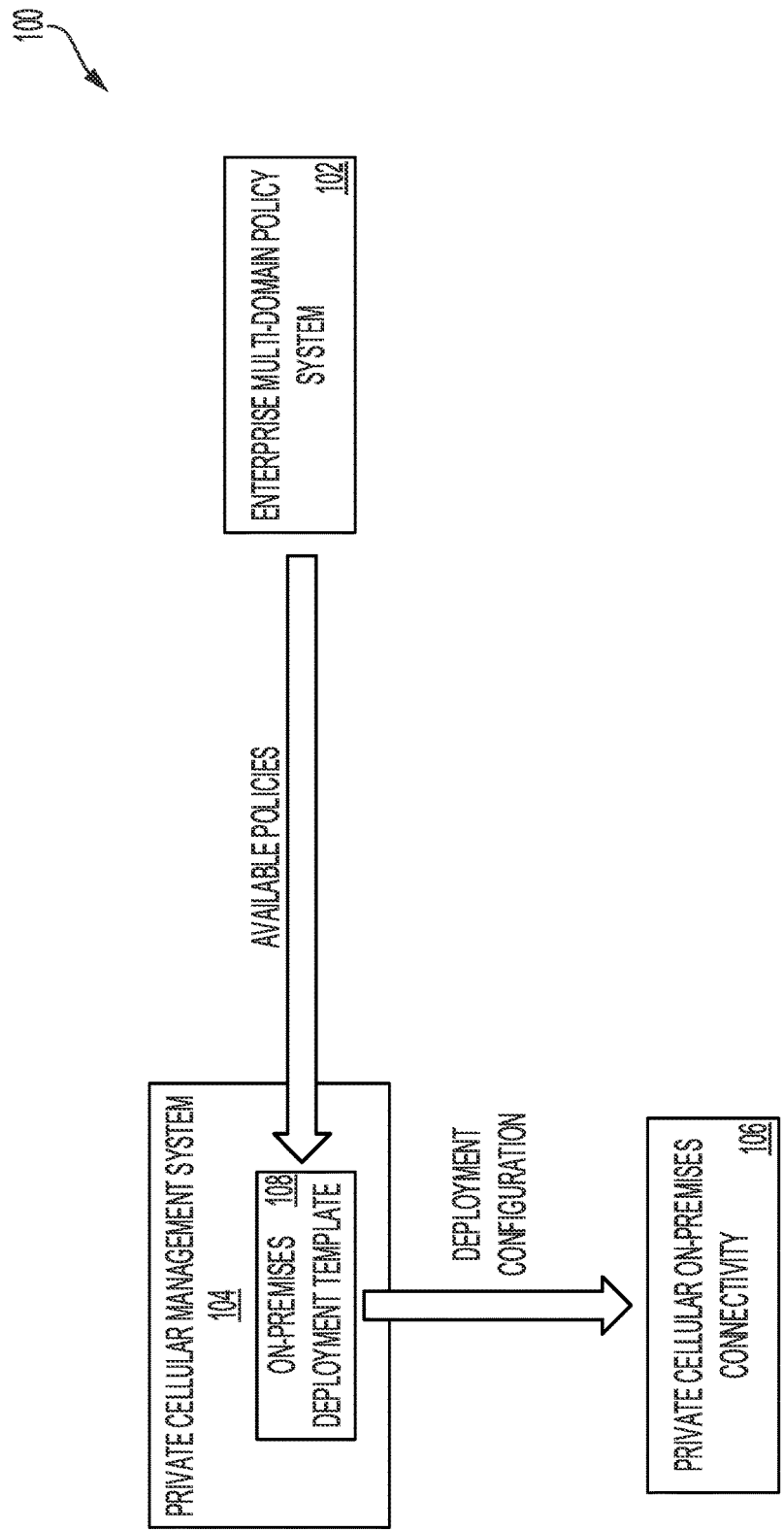
FIG. 1 shows an illustrative example of an environment in which policy attributes are exchanged between an enterprise multi-domain policy system and a private cellular management system to allow for a desired policy across the connectivity domains in accordance with at least one embodiment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for the convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Overview

Disclosed herein are systems, methods, and computer-readable storage media for the coordination and automation of policy and identity attribute distribution between security policy management platforms and 5GaaS platforms.

In an example, a computer-implemented method comprises detecting that a device has connected to a private cellular network. The device is associated with a device group. Further, the device group is associated with an access policy applicable within an enterprise network and the private cellular network. The computer-implemented method further comprises generating a determination corresponding to policy effectiveness associated with the access policy. The determination is generated based on an enterprise version of the access policy implemented in the enterprise network and a private cellular network version of the access policy implemented in the private cellular network. The computer-implemented method further comprises obtaining an update to the access policy. The update corresponds to the enterprise version of the access policy. The computer-implemented method further comprises applying the update to the access policy for the device and other devices associated with the device group.

In an example, the determination indicates that the private cellular network version of the access policy is ineffective for the device group. Further, the update to the access policy is applied during a subsequent connection by the device to the private cellular network.

In an example, the determination indicates that the private cellular network version of the access policy matches the enterprise version of the access policy. Further, the computer-implemented method comprises obtaining information corresponding to the effectiveness of the access policy for the private cellular network. The computer-implemented method further comprises providing the information.

In an example, the information includes a recommendation for a policy exception to the access policy. Further, the policy exception corresponds to a characteristic of the private cellular network.

In an example, the enterprise version of the access policy is determined through secondary authorization associated with the enterprise network.

In an example, applying the update includes signaling the update to a session management function associated with the private cellular network for application via a user plane function associated with the private cellular network.

In an example, the enterprise version of the access policy is determined based on a notification associated with the enterprise network. Further, the notification indicates a set of updates to use cases supported by the private cellular network. Additionally, the use cases are associated with the device group.

In an example, a system comprises one or more processors and memory including instructions that, as a result of being executed by the one or more processors, cause the system to detect that a device has connected to a private cellular network. The device is associated with a device group. Further, the device group is associated with an access policy applicable within an enterprise network and the private cellular network. The instructions further cause the system to generate a determination corresponding to a policy effectiveness associated with the access policy. The determination is generated based on an enterprise version of the access policy implemented in the enterprise network and a private cellular network version of the access policy implemented in the private cellular network. The instructions further cause the system to obtain an update to the access policy. The update corresponds to the enterprise version of the access policy. The instructions further cause the system to apply the update to the access policy for the device and other devices associated with the device group.

In an example, a non-transitory computer-readable storage medium stores thereon executable instructions that, as a result of being executed by one or more processors of a computer system, cause the computer system to detect that a device has connected to a private cellular network. The device is associated with a device group. Further, the device group is associated with an access policy applicable within an enterprise network and the private cellular network. The executable instructions further cause the computer system to generate a determination corresponding to a policy effectiveness associated with the access policy. The determination is generated based on an enterprise version of the access policy implemented in the enterprise network and a private cellular network version of the access policy implemented in the private cellular network. The executable instructions further cause the computer system to obtain an update to the access policy. The update corresponds to the enterprise version of the access policy. The executable instructions further cause the computer system to apply the update to the access policy for the device and other devices associated with the device group.

Description of Example Embodiments

Figure 8:
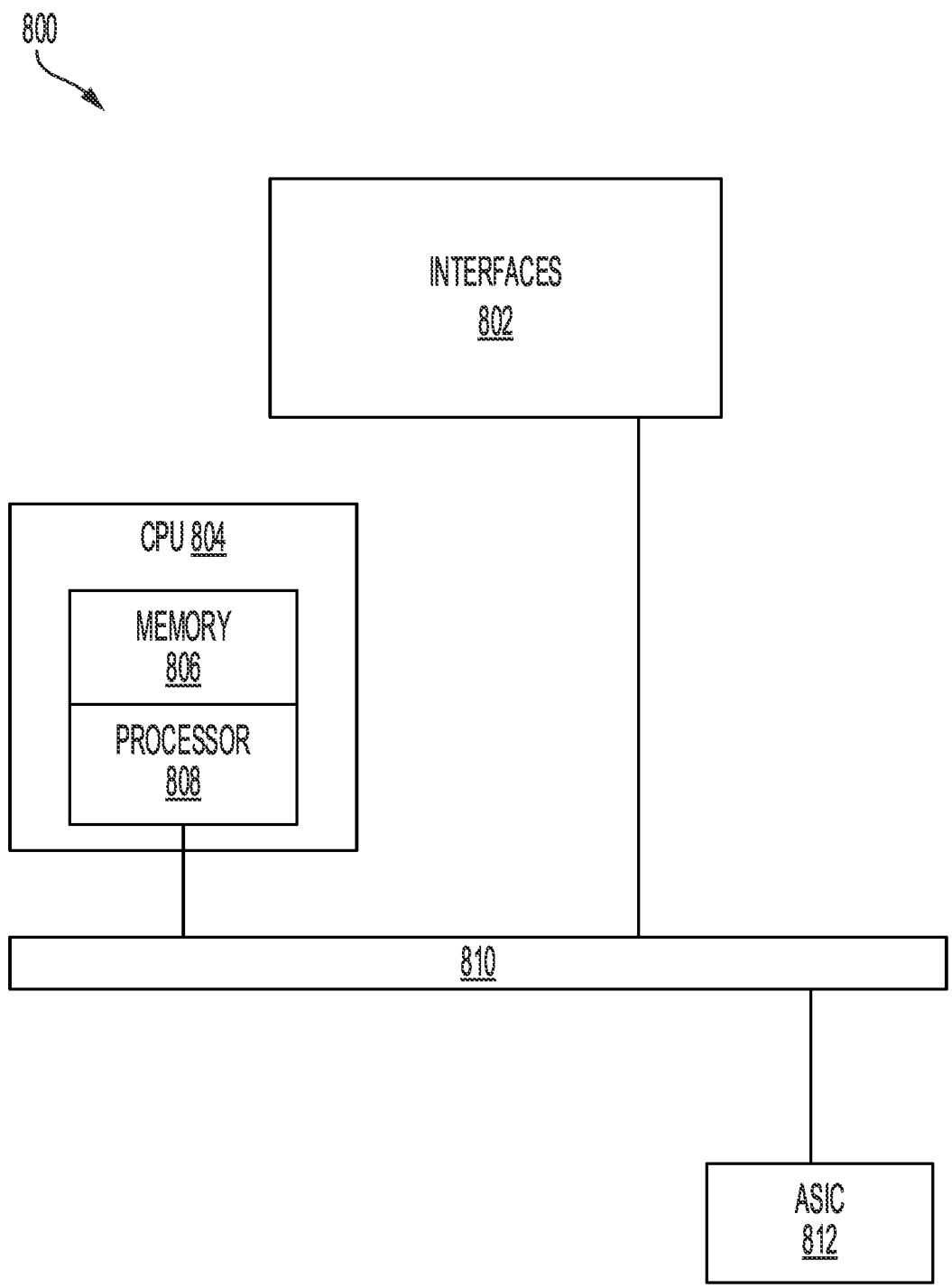
FIG. 8 illustrates an example network device suitable for performing switching, routing, and other networking operations in accordance with some embodiments.
Figure 9:
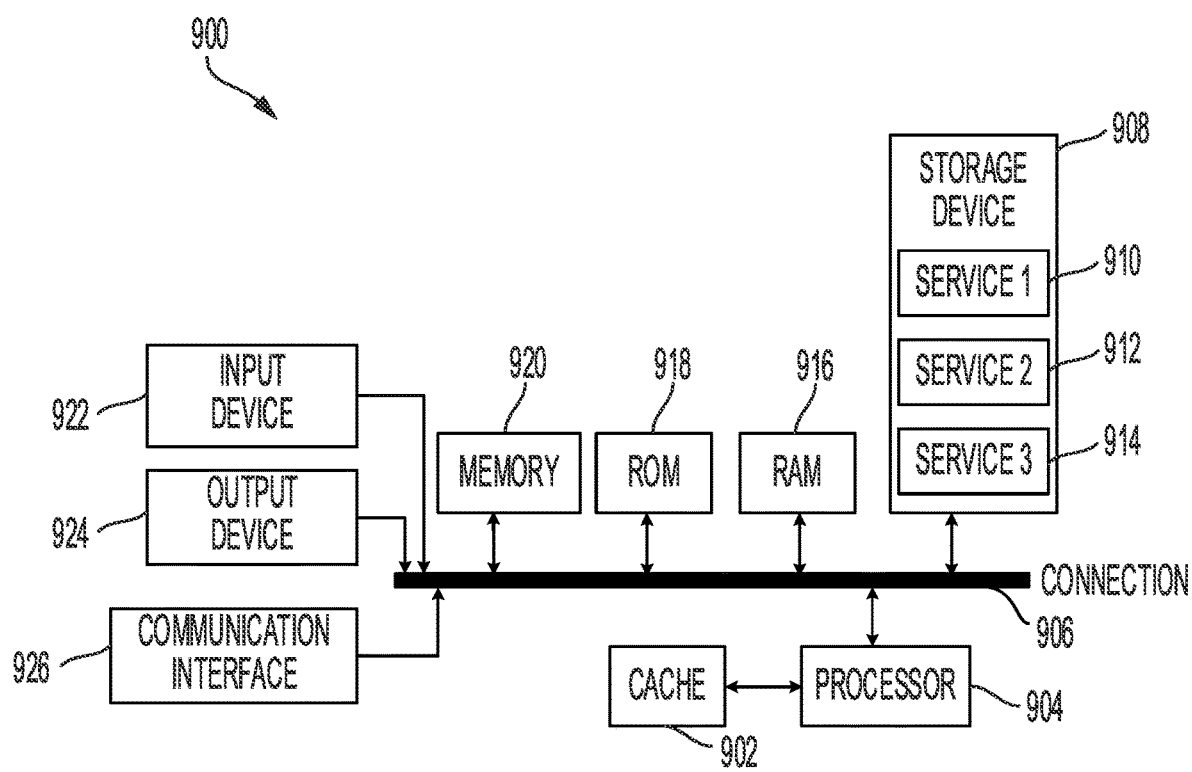
FIG. 9 illustrates a computing system architecture including various components in electrical communication with each other using a connection in accordance with some embodiments.

Disclosed herein are systems, methods, and computer-readable storage media for applying a set of enterprise network policies in a private cellular network domain for a set of use cases. The present technologies will be described in more detail in the following disclosure as follows. The discussion begins with a detailed description of example systems, processes, and environments for propagating enterprise network policies to private cellular networks to provide similar experiences to devices across different connectivity domains, as illustrated in FIGS. 1 through 7. The discussion concludes with a description of an example network and computing devices, as illustrated in FIGS. 8 and 9.

FIG. 1 shows an illustrative example of an environment 100 in which policy attributes are exchanged between an enterprise multi-domain policy system 102 and a private cellular management system 104 to allow for a desired policy across the connectivity domains in accordance with at least one embodiment. In the environment 100, an organization maintains an enterprise multi-domain policy system 102 through which the organization may define a set of policy attributes that may be implemented within the enterprise network and, as described in further detail herein, propagated and exchanged through other connectivity domains, such as through a private cellular network. For instance, the organization may maintain, in addition to the enterprise multi-domain policy system 102, a private cellular management system 104 and private cellular on-premises connectivity 106, which may collectively implement the private cellular network for the organization.

The private cellular management system 104, in an embodiment, implements a 5GaaS platform, through which the private cellular management system 104 and the enterprise multi-domain policy system 102 may share various policy attributes amongst themselves. In some instances, the organization may use the private cellular management system 104 for onboarding new devices onto the 5GaaS platform. As part of this process, these devices may be onboarded with policies that have been configured through unified data management and the unified data repository (UDM/UDR).

When a device accesses the private cellular management system 104 to log into the private (e.g., 5GaaS) cellular network, the device may have two sets of policies. The first set of policies may include a set of default policies as per the UDM/UDR configuration. The second set of policies may include policy values derived from the security policy management platform implemented through the enterprise multi-domain policy system 102. These policy values may be configured onto the enterprise multi-domain policy system 102 by an enterprise administrator based on various logic such as device grouping, location, use case, and the like. Thus, when the device logs into the 5GaaS cellular network, the device may obtain the policies and quality of service (QoS) values as per the UDM/UDR configuration and from the security policy management platform implemented by the enterprise multi-domain policy system 102.

Initially, when this device travels to another network that is associated with the enterprise, (e.g., a wired network, a wireless network, etc.), the device may not currently have the new set of policies, applicable to the network, or QoS values from the security policy management platform implemented by the enterprise multi-domain policy system 102 or other policy engines. As such, upon receiving the policies and QoS values from the security policy management platform, the device may be able to deliver a consistent user experience across the networks. Further, this may allow an enterprise administrator to view the policies for all devices at both the security policy management platform and the private cellular management system 104, providing a single "pane of glass" view of the device eco-system.

As illustrated in FIG. 1, the enterprise multi-domain policy system 102 may provide any available policies that are to be shared to the private cellular management system 104. These available policies may be implemented into one or more on-premises deployment templates 108. These on-premises deployment templates 108 may be applied in the cellular connectivity plane through the private cellular on-premises connectivity 106, which may comprise a combination of cellular network elements that apply access, session, and traffic policies provided by the private cellular management system 104.

Figure 2:
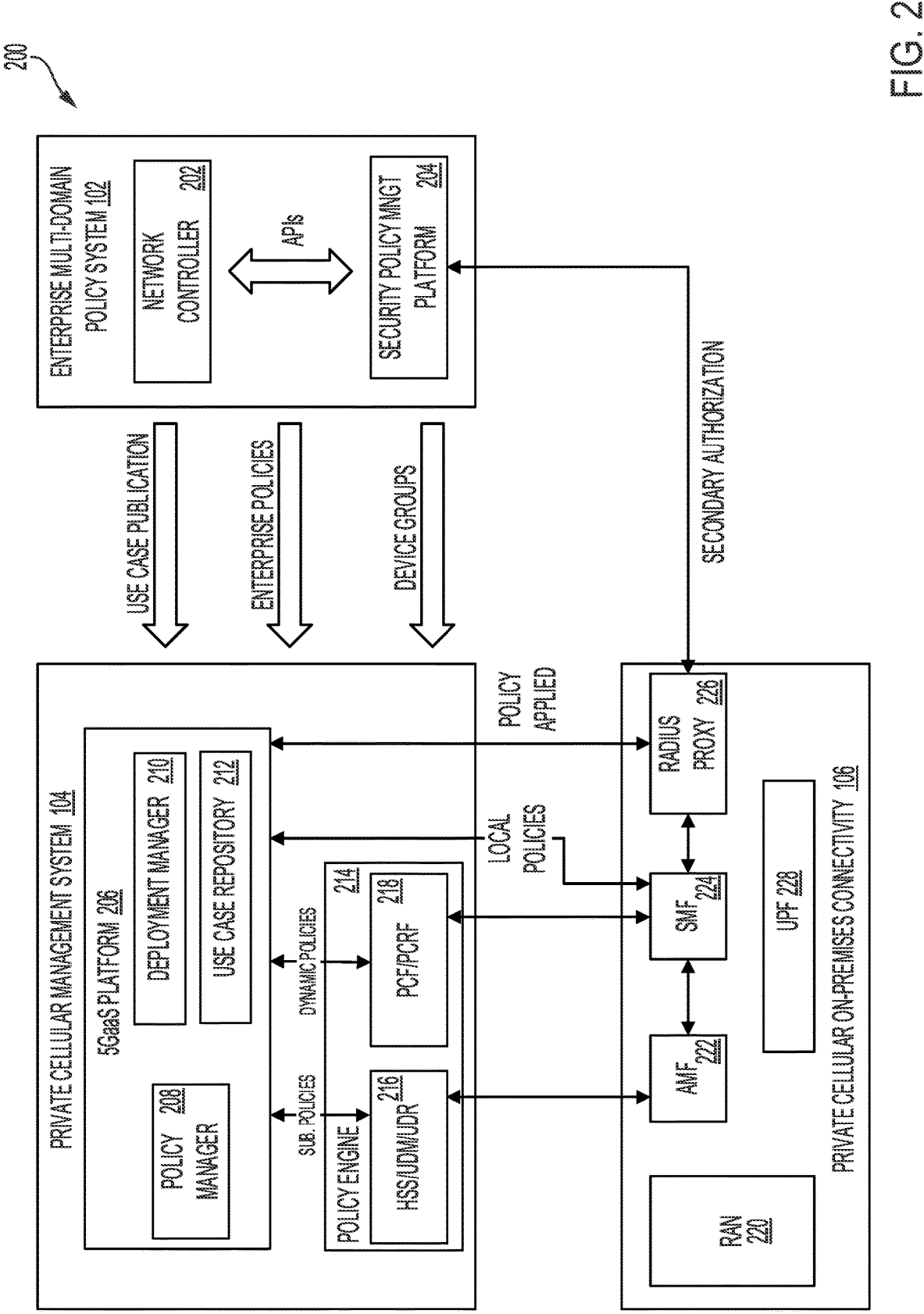
FIG. 2 shows an illustrative example of an environment in which enterprise policies and identities are shared across connectivity domains to allow for a desired policy across the connectivity domains in accordance with at least one embodiment.

FIG. 2 shows an illustrative example of an environment 200 in which enterprise policies and identities are shared across connectivity domains to allow for a desired policy across the connectivity domains in accordance with at least one embodiment. In the environment 200, the enterprise multi-domain policy system 102 includes a combination of a network controller 202 and a security policy management platform 204 that are deployed in the enterprise network. The network controller 202 and the security policy management platform 204 may communicate with one another through application programming interfaces (APIs). Further, the network controller 202 and the security policy management platform 204 may be responsible for intents, policies, and device groups across the enterprise.

In an embodiment, the enterprise multi-domain policy system 102 includes an enterprise use case repository that maintains various enterprise-wide use cases that may be modeled using Unified Modeling Language (UML), "Yet Another Next Generation" (YANG), or any other suitable modeling language. These use cases may be defined considering wired or wireless network access. Further, these describe the behavior or intent of the use case and make use of policies stored in the enterprise use case repository. The enterprise use case repository may be maintained through the network controller 202, which may capture intents.

The enterprise multi-domain policy system 102 may further include an enterprise Use Case Publisher that may be implemented to push, or on request, provide a use case description from the enterprise use case repository to another system. The enterprise Use Case Publisher may be representational state transfer-API (REST-API) based.

The enterprise multi-domain policy system 102 may further include an enterprise policy repository, which may be a database or datastore of policies that are to be applied within the enterprise. These policies may generally be access-technology independent. This repository may be maintained by the security policy management platform 204.

The enterprise multi-domain policy system 102 may further implement an enterprise policy change publisher, which may either push, or on request, provide notifications to other systems that an enterprise-wide policy has been added, modified, or removed. This may be used by another system to determine if any access-specific policies should be changed as a result of the enterprise-wide policy change. The enterprise policy change publisher may be REST-API based.

The private cellular management system 104 may include a 5GaaS platform 206 that provides a 5GaaS portal and deployment management for different policies. The 5GaaS platform 206 may include a deployment manager 210 that is responsible for gathering enterprise input for a specific enterprise use case and for deploying or modifying an enterprise private cellular deployment to satisfy that use case. The deployment manager 210 may further be responsible for receiving notifications or requesting updates of the use case definition from the enterprise. Additionally, the deployment manager 210 may be responsible for determining the policy effectiveness for the one or more use cases where that policy has been applied. The deployment manager 210 may be automated or a combination of automatic and human actions.

The 5GaaS platform 206 may further include a use case repository 212. The use case repository 212 may be a database or datastore of a subset of the enterprise-wide use cases modeled using UML, YANG, or any other suitable modeling language. The use case repository 212 may be used to maintain use cases that are to be supported using the private cellular network.

The 5GaaS platform 206 further includes a policy manager 208 that is implemented to report policies applied in the cellular connectivity plane to the deployment manager 210. The policy manager 208 may maintain policy details specific to the private cellular access network along with relevant device groups.

In an embodiment, the private cellular management system 104 includes a policy engine 214 that provides specific cellular network elements that store policies in a format suitable for consumption by the cellular connectivity plane. For example, as illustrated in FIG. 2, the policy engine 214 may store semi-static, subscription-related policies in a Subscriber Data Management system/UDM/UDR 216. Further, the policy engine 214 may implement a point coordination function/policy and charging rules function (PCF/PCRF) 218 for dynamic policy cases.

The private cellular connectivity plane may be implemented through the private cellular on-premises connectivity 106. The private cellular connectivity plane may be a combination of cellular network elements that apply access, session, and traffic policies provided by the policy engine 214. The private cellular connectivity plane, as illustrated in FIG. 2, may include a radio access network (RAN) 220, an access and mobility management function (AMF) 222, a session management function (SMF) 224, and a user plane function (UPF) 228. In some instances, the private cellular connectivity plane may further include a security policy management platform radius proxy 226, through which the secondary authorization with the enterprise multi-domain policy system 102 may be achieved.

Figure 3A:
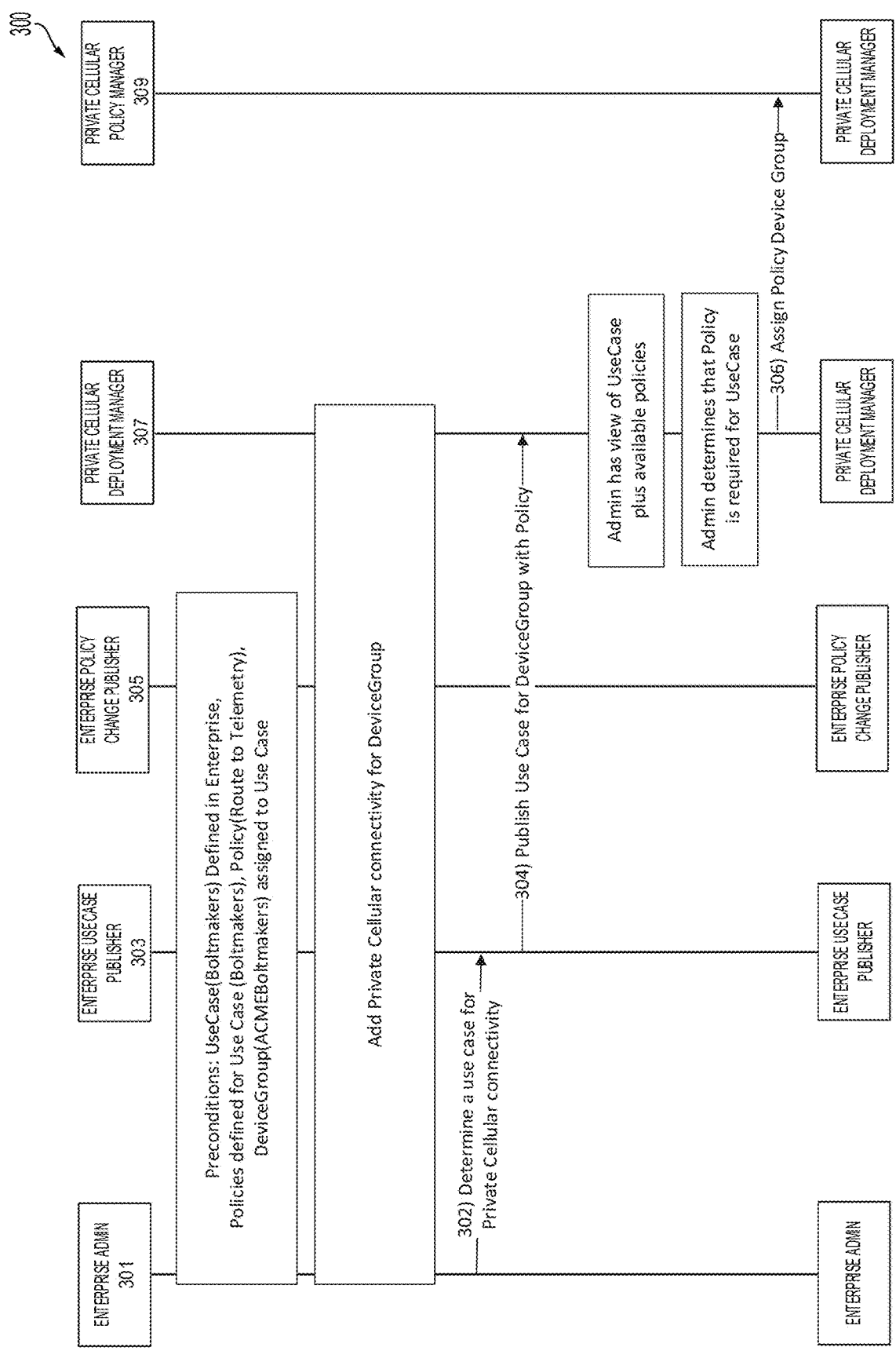
FIGS. 3A-3B show an illustrative example of a process for deployment of a use case, in accordance with at least one embodiment.
Figure 3B:
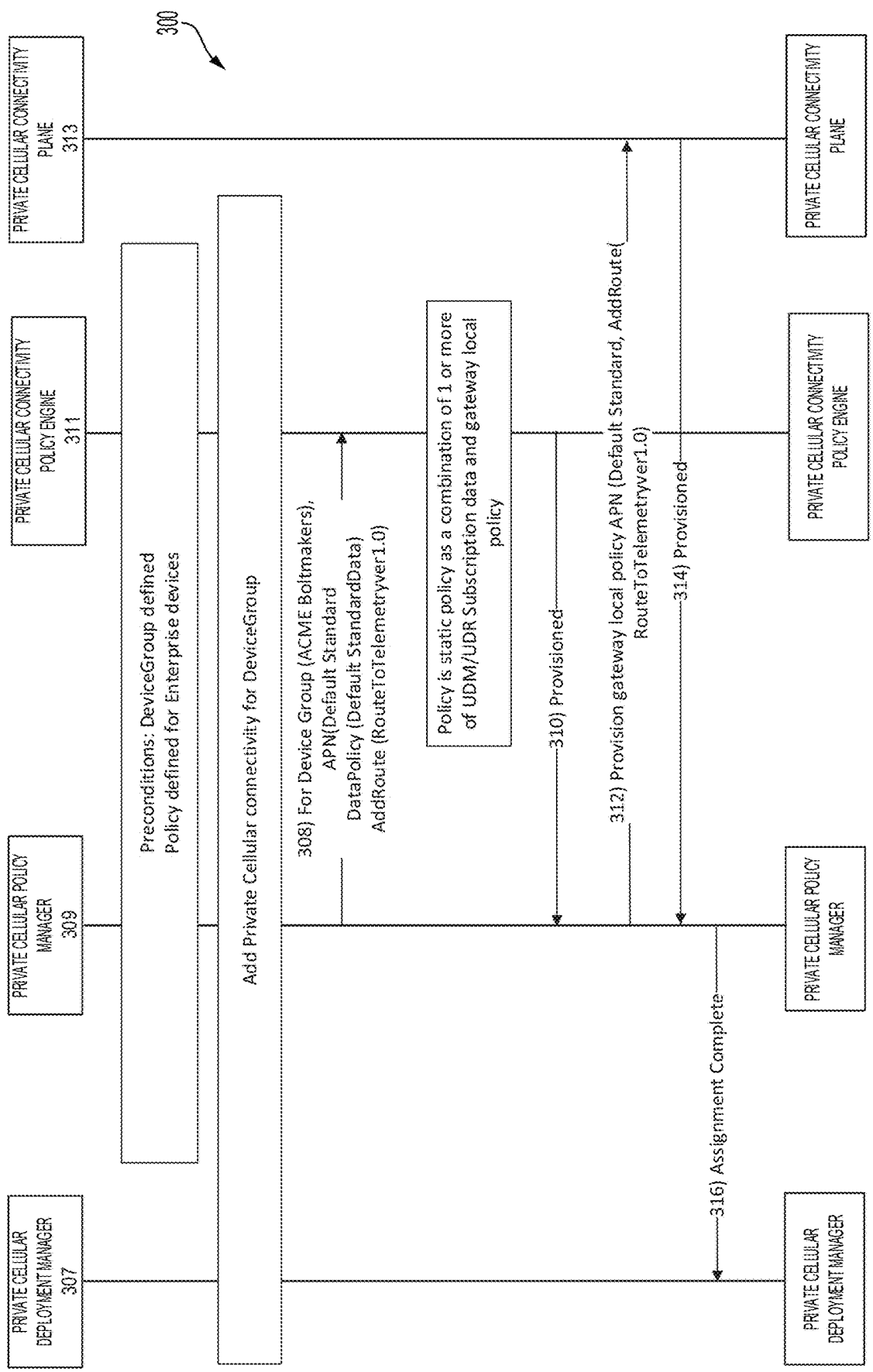

Embodiments herein, in accordance with the previous discussion of FIG. 2, provide for enterprise-specific policies for a given use case that are automatically made known to the private cellular network, whilst permitting the Private Cellular administrator to have the final decision on accepting and applying those policies. Accordingly, FIGS. 3A and 3B show an illustrative example of a process 300 for deployment of a use case, in accordance with at least one embodiment. The process 300 may be performed by the private cellular management system through the 5GaaS platform implemented therein. The process 300 may be performed subject to a set of preconditions. For example, a precondition may include the enterprise having defined a specific use case, associated specific enterprise policies, and device groups that are to be used in the specific use case. This use case may be already deployed using wired, wireless, or any other network access. Another precondition may include the enterprise having defined a base set of groups and policies using the 5GaaS portal described above. These groups and policies may not be use case-specific. In some instances, another precondition may include the enterprise having deployed the private cellular network incorporating the base set of groups and policies defined by the enterprise. This base set of groups and policies may not be linked with any specific use case. The deployment of the private cellular network may also include default policies that are independent of the specific enterprise. The default private cellular network policies may be inherited for all device groups independent of enterprise and use case.

At step 302, in order to add a private cellular connection for a device group, a use case can be published for a device group that is associated with a default policy. For example, the Enterprise administrator 301 determines that a use case for a device group should also be supported using Private Cellular connectivity. In step 304, the use case is then published to the Private Cellular Deployment Manager 307 by the Enterprise Use Case Publisher 303, which stores it in the use case repository of the Private Cellular system. Based on this, the Enterprise administrator 301 can define a base set of groups and policies using a private cellular portal of the private cellular network, as nonspecific use-cases. This may result in the use case being stored by the private cellular deployment manager 307 in the private cellular use case repository. A private cellular system administrator may then have the ability to view the use cases and the associated policies to determine whether a specific policy is required for a corresponding use case. In step 306, the private cellular deployment manager 307 can then assign a policy device group for the use cases and send them to the private cellular policy manager 309. For example, the private cellular deployment manager notifies the administrator of the private cellular system, that support for a use case is required and those additional policies are needed for the use case. The private cellular system administrator can then determine that the policy is already defined as part of a base set of policies associated with a precondition and associated with a device group. The private cellular system administrator can then associate the policy with the device group.

With regards to FIG. 3B, in step 308, the private cellular policy manager 309 provisions the desired policies to the private cellular connectivity policy engine 311. Then, the private cellular connectivity policy engine 311 can include the access point name (APN) or the aggregate maximum bit rate (AMBR), or any combination thereof, as a part of the provisions. Accordingly, in step 312, the provisioned subscription is transmitted from the private cellular connectivity plane 313 to the private cellular policy manager 309. In step 314, the private cellular policy manager 309 sends a response back to the private cellular connectivity plane 313 including the provisioning gateway local policy APN. In this case, the policy that is provisioned can be realized by the private cellular policy manager 309 as a local policy in the private cellular connectivity plane 313. Similarly, in step 316, the private cellular connectivity plane 313 provisions the policy in accordance with the provisional gateway local policy APN as provided by the private cellular policy manager 309. In step 318, the private cellular policy manager 309 notifies the private cellular deployment manager 307 that the assignment of the policy has been completed. Accordingly, a policy configuration for the device group of a particular use case has been completed and is now ready for deployment by the private cellular deployment manager 307.

Figure 4A:
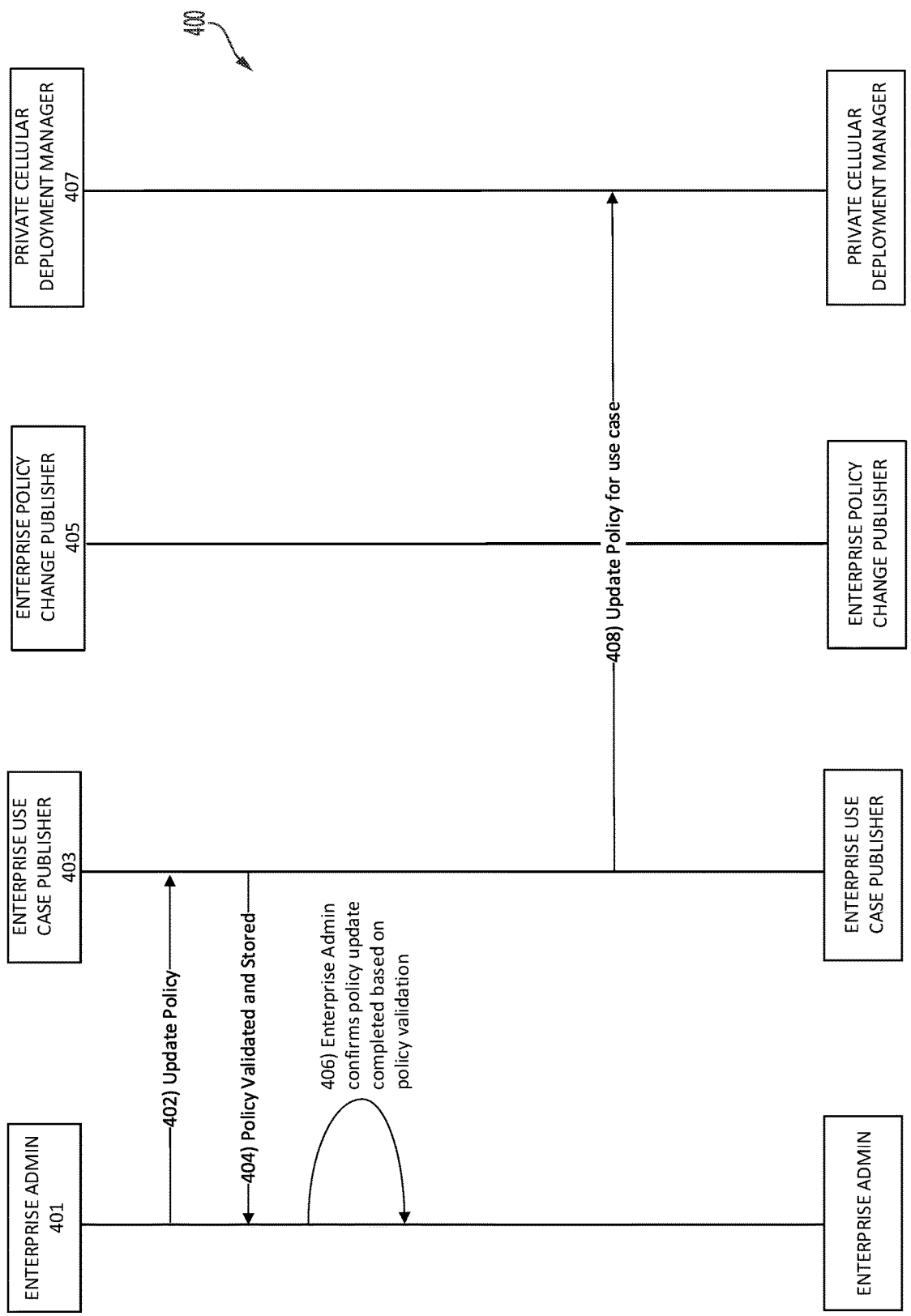

FIGS. 4A-4E show a process 400 of updating a private cellar deployment, in accordance with embodiments. The process 400 is shown by FIGS. 4A-4E where a policy that the enterprise wants to apply is achieved through the configuration of specific policies in the private cellular network when the network is deployed to satisfy a particular use case. Referring to step 402, as illustrated in FIG. 4A, an enterprise administrator 401 can determine that an enterprise policy version is to be updated to a new version. For example, the enterprise administrator 401 may determine that an enterprise policy should be updated from version 1.0 to version 1.1. In step 404, the updated version is validated by the enterprise Use Case Publisher 403 and stored at the enterprise administrator repository. In step 406, based on the validation by the enterprise Use Case Publisher 403, a use case is defined that indicates that the updated policy may be applicable, and stored in an enterprise use case repository. For example, the enterprise administrator 401 can determine that the policy applies to a specific device group, in the context of a use case. The enterprise use case publisher 403 may, accordingly, update the policy within the enterprise use case repository and transmit a notification to the enterprise administrator 401 to confirm that the policy update has been completed for the defined use case. The enterprise administrator 401, in response to this notification, may access the enterprise use case repository to verify that the update has been completed based on the policy validation performed by the enterprise use case publisher 403. In step 408, as the updated policy is also supported using private cellular connectivity, the private cellular deployment manager 407 can be notified of the change. This notification can be used to update any affected use cases supported by the private cellular network. Once the private cellular deployment manager 407 has been notified of the updated policy, the enterprise administrator use case repository is notified by that the private cellular deployment manager 407 that the update of the private cellular deployment manager 407 has been completed.

In step 410, as illustrated in FIG. 4B, the private cellular deployment manager 407 queries the private cellular use case repository for a version update that corresponds with the updated policy. Accordingly, the private cellular use case repository provides to the private cellular deployment manager 407, in response to the query, a version update for the updated policy. The device can now be permitted access to connect with the private cellular network. Accordingly, in step 412 the private cellular connectivity policy engine 413 sends an applied policy notification that is received by each device connected to the private cellular network upon session establishment with the network. In step 414, the private cellular policy manager 409 subsequently reports the policy that is applied to each device, as a device group, that includes the current policy in use that was reported to the private cellular policy manager 409 by the private cellular connectivity policy engine 413. In step 416, the private cellular deployment manager 407 determines if the policy is valid and performs a verification process. The private cellular deployment manager 407 queries the private cellular use case repository to determine the policy effectiveness of the policy update and the associated version. Based on this query, the private cellular deployment manager 407 queries the private cellular use case repository to verify the version of the policy to determine policy effectiveness and sends the verification in response to the private cellular deployment manager 407. Based on this verification, in step 418, in the instance where the policy is to be applied to additional devices that are intending to connect, the semi-static subscription-related policy for each device in the device group is updated, through the modification of the subscription data that is sent to the private cellular policy engine 411. In step 420, the private cellular connectivity policy engine 413 notifies the private cellular deployment manager 407 that the modification of the subscription data has been completed.

In step 422, as illustrated in FIG. 4C, the private cellular deployment manager 407 notifies the enterprise administrator 401 that the new policy has been applied in the private cellular network if it is determined that the policy version is verified in step 418. Alternatively, in step 424, if the policy version is not verified, a notification error is sent to the enterprise administrator 401, notifying the enterprise administrator 401 of the non-verification of the policy version. For example. If the policy version is not verified, thus the policy version does not match, a failure is determined where the device reporting policy is determined to not be a part of a device group that is known to the private cellular network.

Figure 4D:
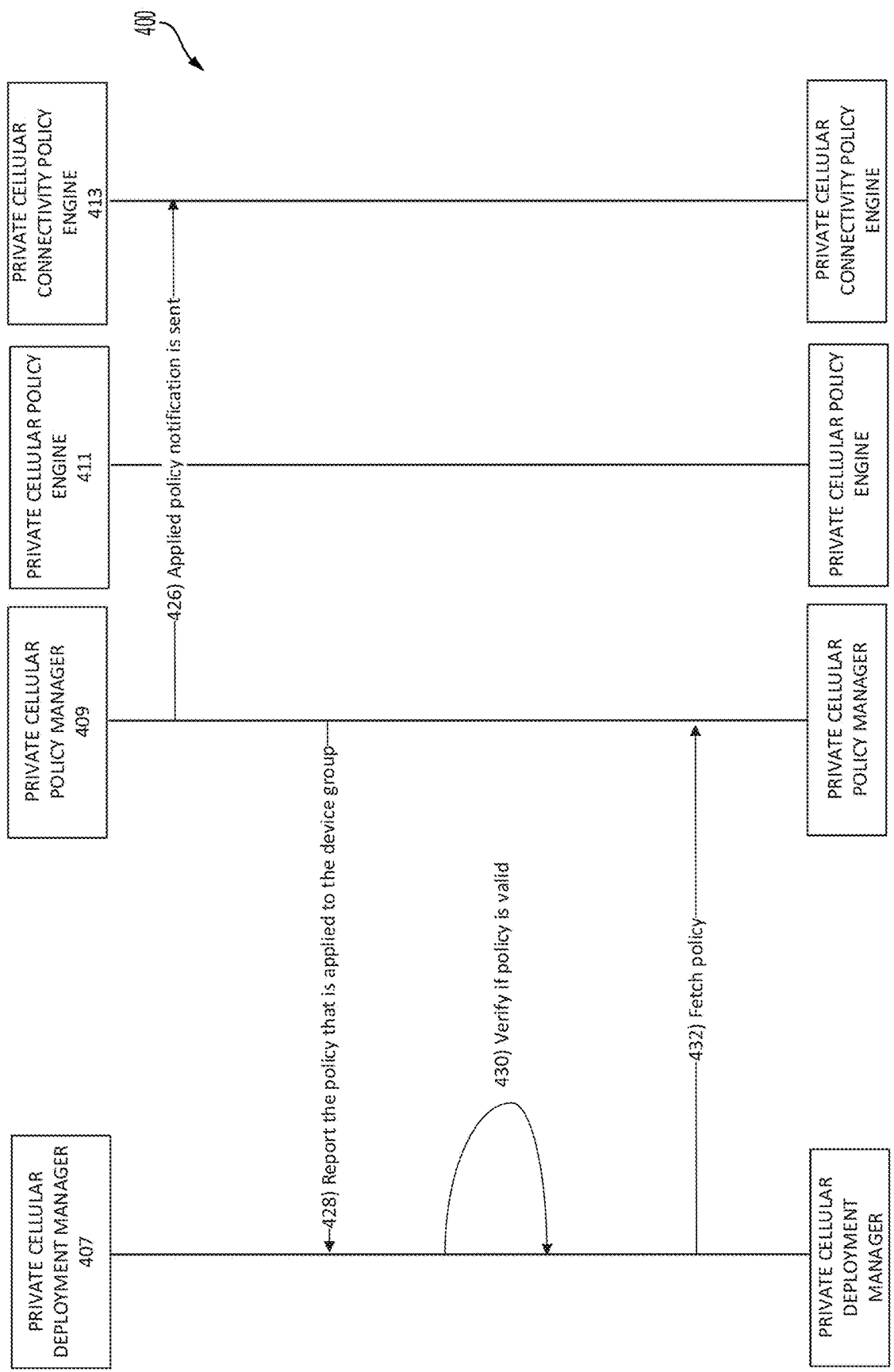
Figure 4E:
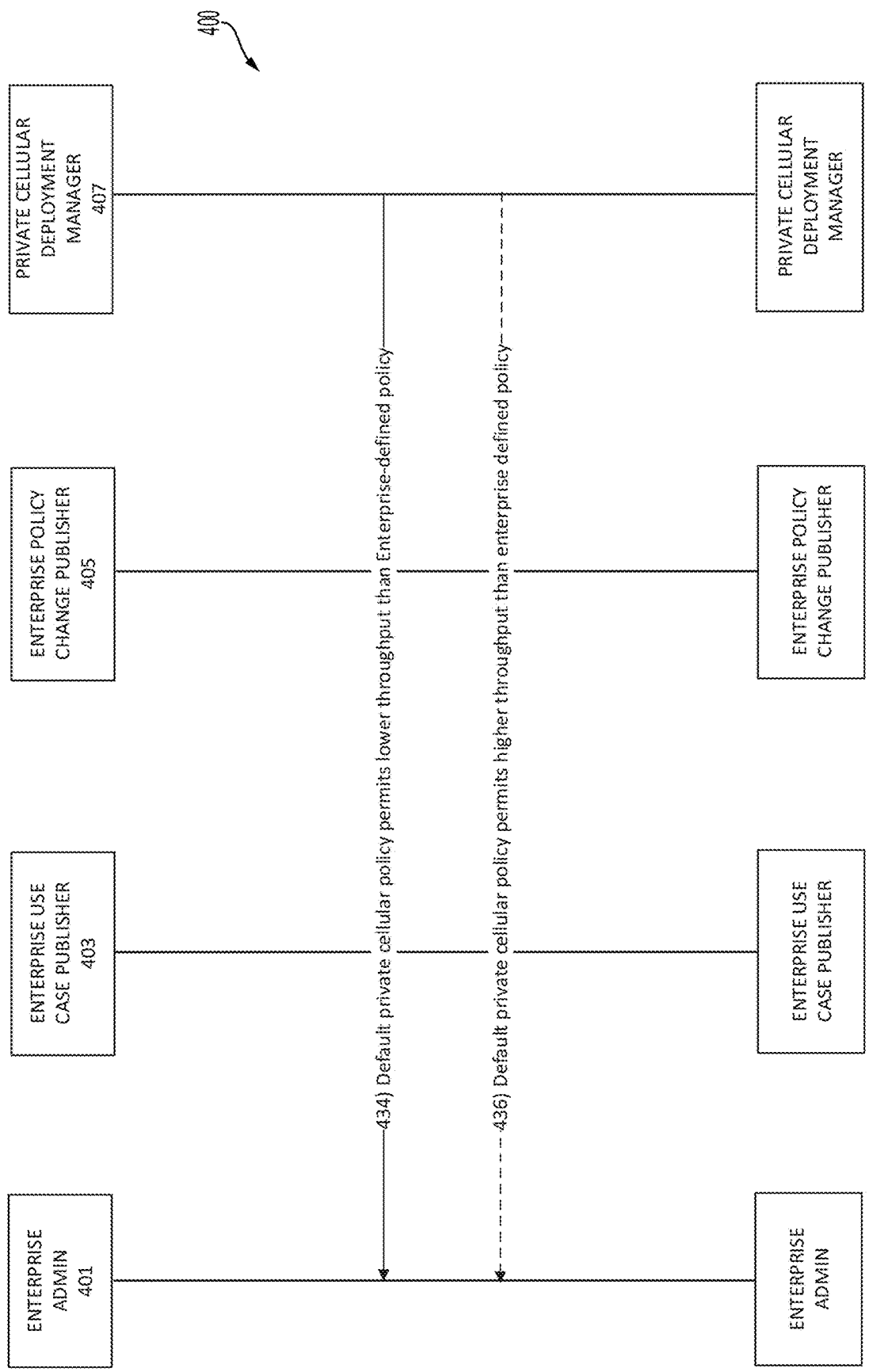

The steps illustrated in FIGS. 4D and 4E demonstrate a case where an enterprise-wide policy is defined that rate limits traffic for a device group independent of access connectivity. The policy is being applied directly from the enterprise policy system via secondary authorization approaches. Accordingly, in step 426, after the device connects to the private cellular network, an applied policy notification, including a current policy that is being used by a device, is sent from the private cellular connectivity policy engine 413 to the private cellular policy manager 409. The policy that is in use is subsequently reported to the private cellular policy deployment manager 407, in step 428. In step 430, the private cellular deployment manager 407 queries the private cellular use case repository to determine if the reported policy is valid. If the private cellular deployment manager 407 determines that policy is valid and that the policy versions match, the private cellular deployment manager 407 may apply the policy as the enterprise requested. In step 432, the private cellular deployment manager 407 then fetches the policy from the private cellular policy manager 409. Fetching the policy allows the Enterprise Administrator to determine the effectiveness of the rate-limiting when applied in the context of the private cellular network. In step 434, the private cellular deployment manager 407 notifies the enterprise administrator 401 that a lower throughput can be permitted in accordance with the default private cellular policy rather than the enterprise-defined policy. Therefore, the enterprise administrator 401 is notified that no further changes are needed to the policy for the use case. In step 436, if the cellular connectivity network can offer higher throughput for the use case, the enterprise administrator 401 is notified by the private cellular deployment manager 407 of the specific device connecting to the private cellular network, and the recommended rate limit value for the cellular connectivity network. In both step 434 and step 436, the enterprise administrator 401 has enough information to determine if a policy exception should be permitted for this case. The policy exception could be realized in the Enterprise policy system. Alternatively, a dynamic policy could be added to the private cellular system that would override the rate limiting provide during secondary authorization.

Figure 5:
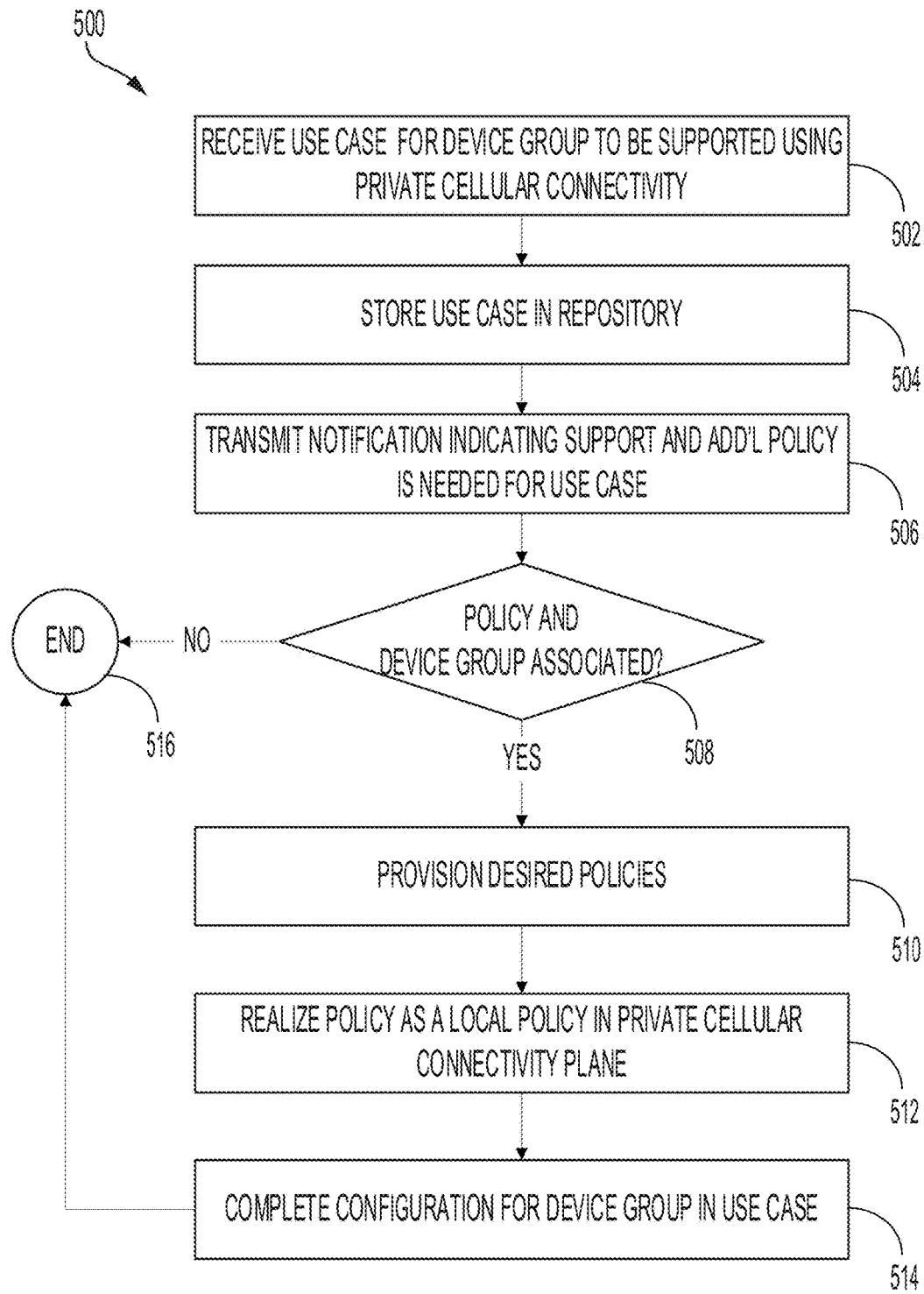
FIG. 5 shows an illustrative example of a process for applying enterprise policies for a device group associated with a use case in a private cellular network deployment in accordance with at least one embodiment.

FIG. 5 shows an illustrative example of a process 500 for applying enterprise policies for a device group associated with a use case in a private cellular network deployment in accordance with at least one embodiment. The process 500 may be performed by the private cellular management system through the 5GaaS platform implemented therein. Similar to the embodiments in the discussion above, the process 500 may be performed subject to a set of preconditions.

At step 502, the private cellular management system may receive a use case for a device group that is to be supported using private cellular connectivity. For instance, the enterprise may determine that a use case for a particular device group should also be supported using private cellular connectivity. As a result, the enterprise may publish the use case to the private cellular deployment manager of the private cellular management system. This may cause the private cellular deployment manager to, at step 504, store the use case in the use case repository of the platform.

In step 506, the private cellular management system notifies the administrator of the private cellular system that supports for the use case is required and that an additional policy is needed for the use case. The administrator, in response to this notification, may determine that the policy is already defined as part of the base set provided by the enterprise (as per the preconditions described above) as is the device group. The administrator, accordingly, may associate the policy with the device group. Thus, in step 508, the private cellular management system may determine whether the policy and the device group have been associated. If not, the process 500 may end at step 516.

Once the policy and the device group have been associated by the administrator, the private cellular management system, at step 510, may provide the desired policies to the private cellular connectivity policy engine. By this point, the enterprise policies specific for the device group in the specific use case are known, evaluated, and accepted for use in the private cellular deployment. At step 512, the private cellular management system may realize the policy as a local policy in the private cellular connectivity plane. This realization of the policy, at step 514, results in the policy configuration for the device group in the use case being completed, after which the process 500 may end at step 516.

Figure 6:
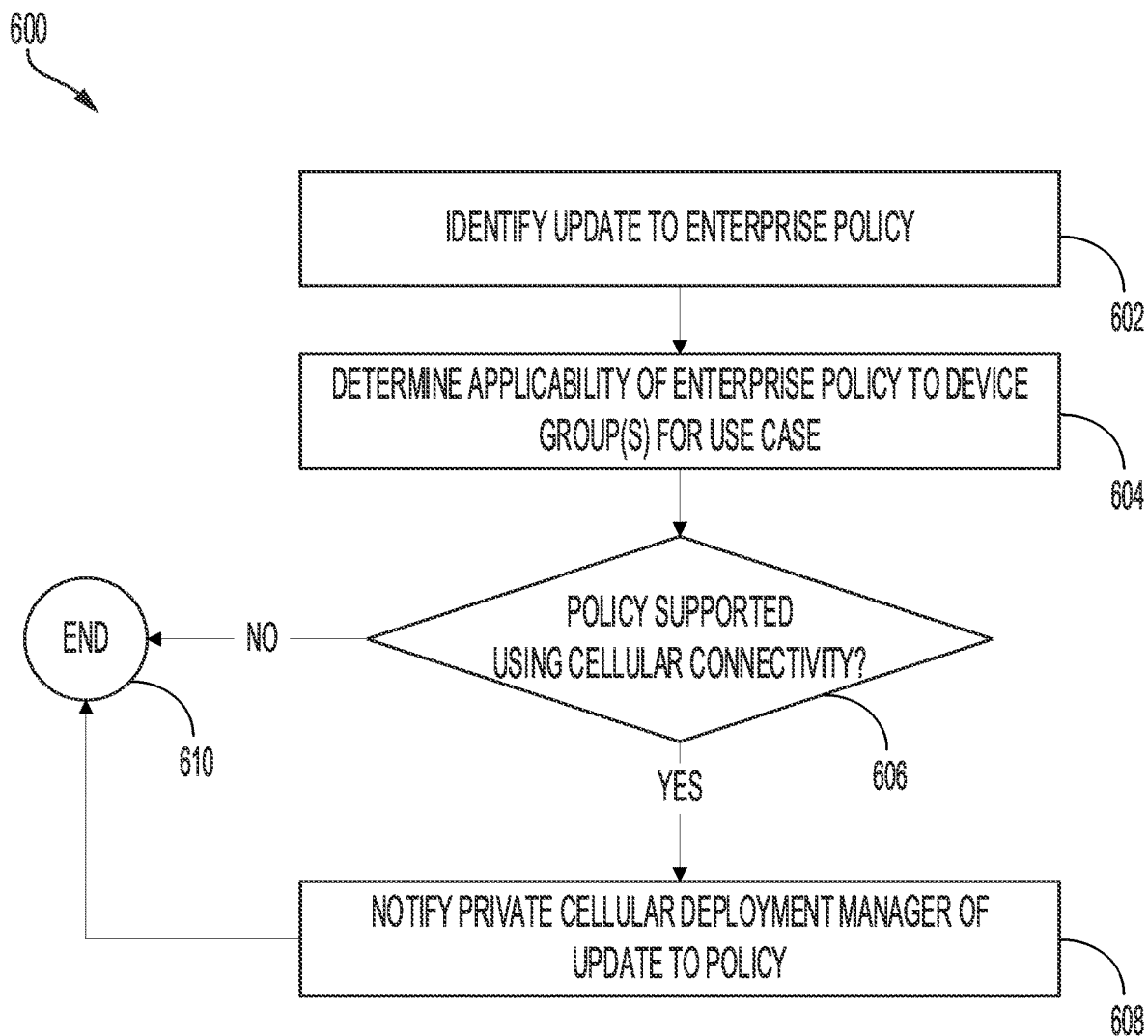
FIG. 6 shows an illustrative example of a process for deploying an update to an enterprise policy to a private cellular network in accordance with at least one embodiment.

FIG. 6 shows an illustrative example of a process 600 for deploying an update to an enterprise policy to a private cellular network in accordance with at least one embodiment. The process 600 may be performed by the enterprise multi-domain policy system. At step 602, the enterprise multi-domain policy system may identify an update to an enterprise policy. As an illustrative example, the enterprise multi-domain policy system may determine that an enterprise policy "RouteToTelemetry" should be updated from version 1.0 to version 1.1.

At step 604, the enterprise multi-domain policy system may determine the applicability of the enterprise policy to one or more device groups for a particular use case. Returning to the previous illustrative example, the enterprise multi-domain policy system may determine that the updated "RouteToTelemetry" policy applies to the device group "ACMEBoltmakers" in the context of the use case "Boltmakers." Accordingly, the enterprise multi-domain policy system may update the enterprise use case repository to apply the update to the policy within the enterprise for this particular use case.

At step 606, the enterprise multi-domain policy system may determine whether the policy is supported using cellular connectivity. If the enterprise multi-domain policy system determines that the policy is not supported using cellular connectivity, the process 600 may end at step 610. However, if the enterprise multi-domain policy system determines that the policy is supported using cellular connectivity, the enterprise multi-domain policy system, at step 608, may notify the private cellular deployment manager of the update to the policy. Returning to the aforementioned illustrative example, the enterprise multi-domain policy system may transmit a notification to the private cellular deployment manager that indicates that the policy "RouteToTelemetry" has been updated to version 1.1 and that it applies to the device group "ACMEBoltmakers" in the context of the use case "Boltmakers." Accordingly, the private cellular deployment manager may update the affected use case supported by the private cellular network. However, at this stage, the updated policy has not been applied to any device connecting using the private cellular network. Once the enterprise multi-domain policy system has notified the private cellular deployment manager of the update to the policy, the process 600 may end at step 610.

Figure 7:
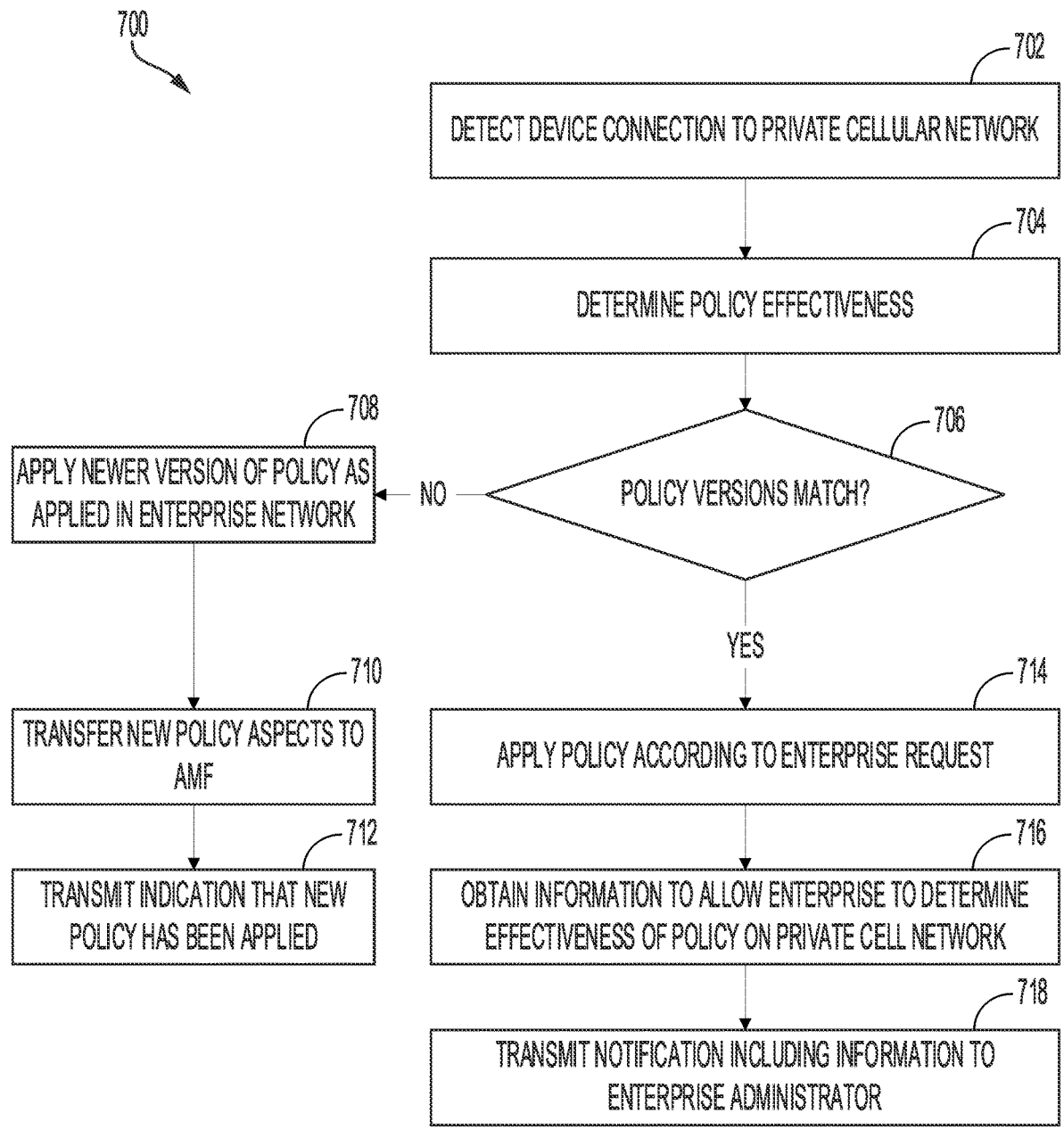
FIG. 7 shows an illustrative example of a process for applying an enterprise policy for a device group regardless of access connectivity in accordance with at least one embodiment.

FIG. 7 shows an illustrative example of a process 700 for applying an enterprise policy for a device group regardless of access connectivity in accordance with at least one embodiment. The process 700 may be performed by the private cellular management system. At step 702, the private cellular management system may detect a device connection to the private cellular network. The private cellular management system determines the current policy in use for the device group that the device is associated with. At step 704, the private cellular management system may determine policy effectiveness for the current policy in use for the device group. For instance, if the private cellular management system has been notified of an update to the policy, which may result in an update to any affected use cases supported by the private cellular network, and the policy has not been applied for any device connecting to the private cellular network, the private cellular management system may determine that the current version of the policy for the device group is ineffective and that the newer version of the policy should be used the next time any device in the device group connects to the private cellular network.

In some instances, the enterprise policy may be applied directly from the enterprise multi-domain policy system through secondary authorization approaches. Thus, when the device connects to the private cellular network, the private cellular management system may determine that the policy versions match such that the policy may be applied as requested by the enterprise. This may be the first time that the private cellular management system learns of which enterprise policy has been applied, as policy delivery is performed through secondary authorization. Thus, regardless of the method of delivery of the enterprise policy, at step 706, the private cellular management system may determine whether the policy versions match.

If the policy versions do not match, the private cellular management system, at step 708, may apply the newer version of the policy as applied in the enterprise network. For instance, the private cellular management system may update the semi-static subscription-related policy for each device in the device group according to the newer version of the policy.

At step 710, the private cellular management system may transfer the new policy aspects related to the newer version of the policy to the AMF. In an embodiment, since the new version of the policy is being applied through a private cellular system, extensions to $3^{rd}$ Generation Partnership Project (3GPP) subscription data can be used to transfer these new policy aspects to the AMF. In some instances, the new policy aspects may be signaled on to the SMF for application via the UPF.

At step 712, the private cellular management system may transmit an indication that the new version of the policy has been successfully applied. For instance, the private cellular management system may notify the enterprise administrator that the new version of the policy has been applied in the private cellular network and that no modifications are recommended.

In an embodiment, if the private cellular management system determines that the policy versions for the particular policy match, the private cellular management system, at step 714, may apply the policy according to the enterprise request. As noted above, this may be the first time that the private cellular management system learns of which enterprise policy has been applied, as policy delivery is performed through secondary authorization in this example.

At step 716, although the policy versions match, the private cellular management system may obtain information to allow the enterprise to determine the effectiveness of the policy on the private cellular network. For example, if the enterprise policy defines a rate limit for network traffic for a device group independent of access connectivity, the private cellular management system may obtain information that may allow an enterprise administrator to determine the effectiveness of rate-limiting when applied in the context of the private cellular network. This information may include recommendations for possible policy exceptions that may be applied to the device or the device group in order to improve network connectivity within the private cellular network. At step 718, the private cellular management system may transmit a notification including this information to the enterprise administrator.

The enterprise administrator may determine the effectiveness of the policy when applied in the context of the private cellular network. If the enterprise administrator determines that there is no benefit in implementing a policy exception for the private cellular network, the enterprise administrator may maintain the current policy without implementing a policy exception for the private cellular network. However, if the enterprise administrator determines that a policy exception should be permitted for the private cellular network and the specific device or device group, the enterprise administrator may realize a policy exception through the enterprise multi-domain policy system. Alternatively, the enterprise administrator may add a dynamic policy to the private cellular network that would override the policy provided during secondary authorization.

FIG. 8 illustrates an example network device 800 suitable for performing switching, routing, and other networking operations in accordance with some implementations. Network device 800 includes a CPU 804, interfaces 802, and a connection 810 (e.g., a Peripheral Component Interconnect (PCI) bus). When acting under the control of appropriate software or firmware, the CPU 804 is responsible for executing packet management, error detection, and/or routing functions. The CPU 804 can accomplish these functions under the control of software including an operating system and any appropriate applications software. The CPU 804 may include one or more processors 808, such as a processor from the Intel® X98 family of microprocessors. In some cases, the processor 808 can be specially designed hardware for controlling the operations of network device 800. In some cases, a memory 806 (e.g., non-volatile RAM, ROM, etc.) also forms part of the CPU 804. However, there are many different ways in which memory could be coupled to the system.

The interfaces 802 are typically provided as modular interface cards (sometimes referred to as "line cards"). Generally, they control the sending and receiving of data packets over the network and sometimes support other peripherals used with the network device 800. Among the interfaces that may be provided are Ethernet interfaces, frame relay interfaces, cable interfaces, Digital Subscriber Line (DSL) interfaces, token ring interfaces, and the like. In addition, various very high-speed interfaces may be provided such as fast token ring interfaces, wireless interfaces, Ethernet interfaces, Gigabit Ethernet interfaces, Asynchronous Transfer Mode (ATM) interfaces, High-Speed Serial Interface (HSSI) interfaces, Packet Over SONET/SDH (POS) interfaces, Fiber Distributed Data Interface (FDDI) interfaces, WiFi interfaces, 3G/4G/5G cellular interfaces, Controller Area Network (CAN) bus, Long Range (LoRa), and the like. Generally, these interfaces may include ports appropriate for communication with the appropriate media. In some cases, they may also include an independent processor and, in some instances, volatile RAM. The independent processors may control such communications-intensive tasks as packet switching, media control, signal processing, crypto processing, and management. By providing separate processors for the communications-intensive tasks, these interfaces allow the master microprocessor 804 to efficiently perform routing computations, network diagnostics, security functions, etc.

Although the system shown in FIG. 8 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 800.

Regardless of the network device's configuration, it may employ one or more memories or memory modules (including memory 806) configured to store program instructions for the general-purpose network operations and mechanisms for roaming, route optimization, and routing functions described herein. The program instructions may control the operation of an operating system and/or one or more applications, for example. The memory or memories may also be configured to store tables such as mobility binding, registration, and association tables, etc. Memory 806 could also hold various software containers and virtualized execution environments and data.

The network device 800 can also include an application-specific integrated circuit (ASIC) 812, which can be configured to perform routing and/or switching operations. The ASIC 812 can communicate with other components in the network device 800 via the connection 810, to exchange data and signals and coordinate various types of operations by the network device 800, such as routing, switching, and/or data storage operations, for example.

FIG. 9 illustrates a computing system architecture 900 including various components in electrical communication with each other using a connection 906, such as a bus, in accordance with some implementations. An example system architecture 900 includes a processing unit (CPU or processor) 904 and a system connection 906 that couples various system components including the system memory 920, such as ROM 918 and RAM 916, to the processor 904. The system architecture 900 can include a cache 902 of high-speed memory connected directly with, in close proximity to, or integrated as part of the processor 904. The system architecture 900 can copy data from the memory 920 and/or the storage device 908 to the cache 902 for quick access by the processor 904. In this way, the cache can provide a performance boost that avoids processor 904 delays while waiting for data. These and other modules can control or be configured to control the processor 904 to perform various actions.

Other system memory 920 may be available for use as well. The memory 920 can include multiple different types of memory with different performance characteristics. The processor 904 can include any general purpose processor and a hardware or software service, such as service 1 910, service 2 912, and service 3 914 stored in storage device 908, configured to control the processor 904 as well as a special-purpose processor where software instructions are incorporated into the actual processor design. The processor 904 may be a completely self-contained computing system, containing multiple cores or processors, a bus, memory controller, cache, etc. A multi-core processor may be symmetric or asymmetric.

To enable user interaction with the computing system architecture 900, an input device 922 can represent any number of input mechanisms, such as a microphone for speech, a touch-sensitive screen for gesture or graphical input, a keyboard, mouse, motion input, speech, and so forth. An output device 924 can also be one or more of a number of output mechanisms known to those of skill in the art. In some instances, multimodal systems can enable a user to provide multiple types of input to communicate with the computing system architecture 900. The communications interface 926 can generally govern and manage the user input and system output. There is no restriction on operating on any particular hardware arrangement and therefore the basic features here may easily be substituted for improved hardware or firmware arrangements as they are developed.

Storage device 908 is a non-volatile memory and can be a hard disk or other types of computer-readable media which can store data that are accessible by a computer, such as magnetic cassettes, flash memory cards, solid-state memory devices, digital versatile disks, cartridges, RAMs 916, ROM 918, and hybrids thereof.

The storage device 908 can include services 910, 912, 914 for controlling the processor 904. Other hardware or software modules are contemplated. The storage device 908 can be connected to the system connection 906. In one aspect, a hardware module that performs a particular function can include the software component stored in a computer-readable medium in connection with the necessary hardware components, such as the processor 904, connection 906, output device 924, and so forth, to carry out the function.

For clarity of explanation, in some instances, the present technology may be presented as including individual functional blocks including functional blocks comprising devices, device components, steps or routines in a method embodied in software, or combinations of hardware and software.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The computer-executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware, and/or software, and can take any of a variety of form factors. Typical examples of such form factors include laptops, smart phones, small form factor personal computers, personal digital assistants, rackmount devices, standalone devices, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

The invention claimed is:

1. A computer-implemented method comprising:
   detecting that a device has connected to a private cellular network, wherein the device is associated with a device group, and wherein the device group is associated with an access policy applicable within an enterprise network and the private cellular network;
   in response to the detecting, generating a determination corresponding to a policy effectiveness associated with the access policy implemented in the device group, wherein the determination is generated based on a version of the access policy implemented in the enterprise network and a version of the access policy implemented in the device group, wherein the private cellular network was notified of the version of the access policy implemented in the enterprise network as an update that has not yet been applied to the device group;
   determining whether the version of the access policy implemented in the enterprise network matches the version of the access policy implemented at the device;
   in response to the determining resulting in a mismatch:
      obtaining the version of the access policy implemented in the enterprise network; and
      applying the version of the access policy implemented in the enterprise network for the device and other devices associated with the device group;
   in response to the determining resulting in a match:
      applying the version of the access policy implemented in the enterprise network to the other devices associated with the device group;
      determining an effectiveness of the version of the access policy implemented in the enterprise network on the private cellular network; and
      providing, to the enterprise network, a recommendation for a policy exception to be applied at the device group based on the effectiveness.

2. The computer-implemented method of claim 1, wherein the policy exception corresponds to a characteristic of the private cellular network.

3. The computer-implemented method of claim 1, wherein the version of the access policy implemented at the enterprise network is determined through secondary authorization associated with the enterprise network.

4. The computer-implemented method of claim 1, wherein applying the access policy implemented in the enterprise network includes:
signaling an update on to a session management function associated with the private cellular network for application via a user plane function associated with the private cellular network.

5. The computer-implemented method of claim 1, wherein the access policy implemented in the enterprise network is determined based on a notification associated with the enterprise network, wherein the notification indicates a set of updates to use cases supported by the private cellular network, and wherein the use cases are associated with the device group.

6. A system, comprising:
one or more processors; and
memory storing thereon instructions that, as a result of being executed by the one or more processors, cause the system to:
detect that a device has connected to a private cellular network, wherein the device is associated with a device group, and wherein the device group is associated with an access policy applicable within an enterprise network and the private cellular network;
in response to the detecting, generate a determination corresponding to a policy effectiveness associated with the access policy implemented in the device group, wherein the determination is generated based on version of the access policy implemented in the enterprise network a version of the access policy implemented in the device group, wherein the private cellular network was notified of the version of the access policy implemented in the enterprise network as an update that has not yet been applied to the device group;
determine whether the version of the access policy implemented in the enterprise network matches the version of the access policy implemented in the device;
in response to the determining resulting in a mismatch:
obtain the version of the access policy implemented in the enterprise network; and
apply the version of the access policy implemented in the enterprise network for the device and other devices associated with the device group;
in response to the determining resulting in a match:
applying the version of the access policy implemented in the enterprise network to the other devices associated with the device group;
determine an effectiveness of the version of the access policy implemented in the enterprise network on the private cellular network; and
provide, to the enterprise network, a recommendation for a policy exception to be applied at the device group based on the effectiveness.

7. The system of claim 6, wherein the policy exception corresponds to a characteristic of the private cellular network.

8. The system of claim 6, wherein the version of the access policy implemented in the enterprise network is determined through secondary authorization associated with the enterprise network.

9. The system of claim 6, wherein the instructions that cause the system to apply the version of the access policy implemented in the enterprise network further cause the system to:
signal an update on to a session management function associated with the private cellular network for application via a user plane function associated with the private cellular network.

10. The system of claim 6, wherein the version of the access policy implemented in the enterprise network is determined based on a notification associated with the enterprise network, wherein the notification indicates a set of updates to use cases supported by the private cellular network, and wherein the use cases are associated with the device group.

11. A non-transitory, computer-readable storage medium storing thereon executable instructions that, as a result of being executed by one or more processors of a computer system, cause the computer system to:
detect that a device has connected to a private cellular network, wherein the device is associated with a device group, and wherein the device group is associated with an access policy applicable within an enterprise network and the private cellular network;
in response to the detecting, generate a determination corresponding to a policy effectiveness associated with the access policy implemented in the device group, wherein the determination is generated based on a version of the access policy implemented in the enterprise network and a version of the access policy implemented in the device group, wherein the private cellular network was notified of the version of the access policy implemented in the enterprise network as an update that has not yet been applied to the device group;
determine whether the version of the access policy implemented in the enterprise network matches the version of the access policy implemented in the device;
in response to the determining resulting in a mismatch:
obtain the version of the access policy implemented in the enterprise network; and
apply the version of the access policy implemented in the enterprise network for the device and other devices associated with the device group;
in response to the determining resulting in a match:
applying the version of the access policy implemented in the enterprise network to the other devices associated with the device group;
determining an effectiveness of the version of the access policy implemented in the enterprise network on the private cellular network; and
providing, to the enterprise network, a recommendation for a policy exception to be applied at the device group based on the effectiveness.

12. The non-transitory, computer-readable storage medium of claim 11, wherein:
the determination indicates that the version of the access policy implemented in the private cellular network is ineffective for the device group; and
update to the access policy is applied during a subsequent connection by the device to the private cellular network.

13. The non-transitory, computer-readable storage medium of claim 11, wherein the policy exception corresponds to a characteristic of the private cellular network.

14. The non-transitory, computer-readable storage medium of claim 11, wherein the version of the access policy implemented in the enterprise network is determined through secondary authorization associated with the enterprise network.

15. The non-transitory, computer-readable storage medium of claim 11, wherein the executable instructions that cause the computer system to apply the access policy implemented in the enterprise network further cause the computer system to:
   signal an update on to a session management function associated with the private cellular network for application via a user plane function associated with the private cellular network.

16. The non-transitory, computer-readable storage medium of claim 11, wherein the version of the access policy implemented in the enterprise network is determined based on a notification associated with the enterprise network, wherein the notification indicates a set of updates to use cases supported by the private cellular network, and wherein the use cases are associated with the device group.

17. The computer-implemented method of claim 1, wherein the version of the access policy of the enterprise network provides rate limit for network traffic for a device group independent of access connectivity.

18. The computer-implemented method of claim 17, wherein the recommendation is to provide improved network connectivity within the private cellular network by determining the effectiveness of the rate limit.

\* \* \* \* \*